US012691921B2

(12) United States Patent
Pedersen et al.

(10) Patent No.: US 12,691,921 B2
(45) Date of Patent: Jul. 28, 2026

(54) SHOPPING CART WITH LIFTING FENDER

(71) Applicant: TARGET BRANDS, INC,
Minneapolis, MN (US)

(72) Inventors: Sara L. Pedersen, Minneapolis, MN
(US); Alex K. Poniatowski, New Hope,
MN (US); Hermann Eichele, Leipheim
(DE); Stefan Remmele, Offingen (DE);
Dieter Stöckle, Landensberg (DE);
Thomas Gasche, Leipheim (DE); **Peter
Irlbacher**, Schwarzenfeld (DE);
Johann Daminger, Neu-Ulm (DE);
William Kiser, Lincolnton, NC (US)

(73) Assignee: TARGET BRANDS, INC,
Minneapolis, MN (US)

( * ) Notice: Subject to any disclaimer, the term of this
patent is extended or adjusted under 35
U.S.C. 154(b) by 378 days.

(21) Appl. No.: 18/383,848

(22) Filed: Oct. 25, 2023

(65) Prior Publication Data

US 2024/0132130 A1 Apr. 25, 2024
US 2024/0227898 A9 Jul. 11, 2024

Related U.S. Application Data

(60) Provisional application No. 63/419,327, filed on Oct.
25, 2022.

(51) Int. Cl.
B62B 3/18 (2006.01)

(52) U.S. Cl.
CPC ...................................... B62B 3/18 (2013.01)

(58) Field of Classification Search
CPC ..... B62B 3/1492; B62B 3/1496; B62B 3/182;
B62B 3/18; B62B 2301/044
(Continued)

(56) References Cited

U.S. PATENT DOCUMENTS 3,048,420 A 8/1962 Ulmanoff
4,647,055 A 3/1987 Weill
(Continued)

FOREIGN PATENT DOCUMENTS

CA 153457 A 2/1914
CH 630856 7/1982
(Continued)

OTHER PUBLICATIONS

Target shopping cart target gift card with photo of shopping cart,
retrieved May 7, 2024, https://www.target.com/p/target-shopping-
cart-10-target-giftcard/-/A-90247833 (Year: 2024).
(Continued)

*Primary Examiner* — James A Shriver, II
*Assistant Examiner* — Hilary L Johns
(74) *Attorney, Agent, or Firm* — Griffiths & Seaton
PLLC; Joann M. Seaton

(57) ABSTRACT

A shopping cart for use in forming a horizontal stack of
shopping carts that includes a support frame, a basket, and
a lifting fender. The support frame includes a chassis and
support masts extending substantially vertically from the
chassis. The chassis is coupled to front wheels and rear
wheels and includes a rear cross bar extending across the
chassis. The basket is supported by the support masts over
the chassis and defines a compartment. The lifting fender is
formed separately from the support frame and is selectively
coupled to an underside of the rear cross bar. The lifting
fender defines a lift section extending below the rear cross
bar and defines a bottom surface configured to be the initial
contact point for a second, rear shopping cart when the
horizontal stack of shopping carts is formed decreasing
contact between the second, rear shopping cart and the rear
cross bar.

20 Claims, 12 Drawing Sheets

(58) Field of Classification Search
USPC ................................................... 280/33.992
See application file for complete search history.

(56) References Cited

U.S. PATENT DOCUMENTS

| | | | |
|---|---|---|---|
| D294,419 S | 2/1988 | Rehrig | |
| 5,137,295 A | 8/1992 | Peek | |
| 5,181,733 A | 1/1993 | Tague | |
| 5,316,328 A | 5/1994 | Bussinger | |
| 5,505,472 A | 4/1996 | Trubiano | |
| 6,041,876 A | 3/2000 | Pulver et al. | |
| 6,098,999 A | 8/2000 | Anastasia | |
| 6,311,941 B1 | 11/2001 | Feldmeyer | |
| 6,422,580 B1 | 7/2002 | Hunter | |
| D463,647 S | 9/2002 | Deal et al. | |
| 6,672,599 B2 | 1/2004 | Thalhofer et al. | |
| 6,761,364 B2 | 7/2004 | Murar et al. | |
| 6,981,708 B1 | 1/2006 | Tucker et al. | |
| D530,478 S | 10/2006 | Splain et al. | |
| 7,192,036 B2 | 3/2007 | Schmid | |
| D540,998 S | 4/2007 | Splain et al. | |
| 7,225,903 B2 | 6/2007 | Nebolon et al. | |
| 7,234,711 B2 | 6/2007 | Gordon et al. | |
| D546,021 S | 7/2007 | Splain et al. | |
| D550,423 S | 9/2007 | Spalin et al. | |
| D556,413 S | 11/2007 | Splain et al. | |
| D564,172 S | 3/2008 | Steinhobel | |
| 7,384,049 B2 | 6/2008 | Peota et al. | |
| 7,398,976 B2 | 7/2008 | Splain et al. | |
| D575,472 S | 8/2008 | Splain et al. | |
| 7,407,169 B2 | 8/2008 | Splain et al. | |
| 7,410,178 B2 | 8/2008 | Splain et al. | |
| 7,416,194 B2 | 8/2008 | Splain et al. | |
| D582,122 S | 12/2008 | Splain et al. | |
| 7,494,135 B2* | 2/2009 | Ash | B62B 3/1476 280/33.991 |
| D588,774 S | 3/2009 | Peota et al. | |
| D588,775 S | 3/2009 | Peota et al. | |
| D591,474 S | 4/2009 | Peota et al. | |
| 7,562,882 B2 | 7/2009 | Acikgoez | |
| 7,600,763 B2 | 10/2009 | Splain et al. | |
| D607,173 S | 12/2009 | Selvig et al. | |
| 7,673,886 B2 | 3/2010 | Ondrasik | |
| 7,766,347 B2 | 8/2010 | Ryan et al. | |
| 7,780,902 B2 | 8/2010 | Pruitt, Jr. et al. | |
| D623,374 S | 9/2010 | Splain et al. | |
| 7,793,948 B2 | 9/2010 | Splain et al. | |
| 7,959,166 B2 | 6/2011 | Splain et al. | |
| D641,532 S | 7/2011 | Peota et al. | |
| D643,175 S | 8/2011 | Peota et al. | |
| D644,810 S | 9/2011 | Peota et al. | |
| D649,732 S | 11/2011 | Muscara | |
| 8,162,331 B2 | 4/2012 | Simonson et al. | |
| D683,102 S | 5/2013 | Muscara' | |
| 8,690,166 B2 | 4/2014 | Peota et al. | |
| 8,827,281 B2* | 9/2014 | Smith | B62B 3/14 280/33.991 |
| 9,085,314 B2 | 7/2015 | Selvig et al. | |
| D760,464 S | 6/2016 | Dyer et al. | |
| 9,637,152 B2 | 5/2017 | Dyer et al. | |
| D794,897 S | 8/2017 | Dyer et al. | |
| D796,769 S | 9/2017 | Stauff | |
| D800,986 S | 10/2017 | Magnusson | |
| D806,976 S | 1/2018 | Peota et al. | |
| D850,754 S | 6/2019 | Peota et al. | |
| D905,370 S | 12/2020 | Poirier et al. | |
| D926,414 S | 7/2021 | Villanova et al. | |
| 11,059,506 B2 | 7/2021 | Hagen et al. | |
| 11,155,291 B2 | 10/2021 | Joaquin | |
| 11,724,728 B2* | 8/2023 | Zutler | B62B 3/18 280/33.996 |
| D1,004,893 S | 11/2023 | Irwin | |
| D1,046,367 S | 10/2024 | Pedersen et al. | |
| D1,049,539 S | 10/2024 | Cheng et al. | |
| D1,054,646 S | 12/2024 | Hogan et al. | |

| | | | |
|---|---|---|---|
| 2002/0135144 A1 | 9/2002 | Murar et al. | |
| 2003/0057666 A1* | 3/2003 | Murar | B62B 3/14 280/33.991 |
| 2003/0116933 A1* | 6/2003 | Nadeau | B60B 33/0057 280/33.991 |
| 2004/0046341 A1 | 3/2004 | Wilkinson | |
| 2005/0082792 A1 | 4/2005 | Gordon et al. | |
| 2005/0241889 A1 | 11/2005 | Nebolon et al. | |
| 2006/0273535 A1 | 12/2006 | O'Quin | |
| 2007/0063463 A1 | 3/2007 | Splain et al. | |
| 2007/0063464 A1 | 3/2007 | Splain et al. | |
| 2007/0063465 A1 | 3/2007 | Splain | |
| 2008/0088101 A1 | 4/2008 | Ferguson | |
| 2008/0111328 A1* | 5/2008 | Ryan | B62B 3/144 280/33.993 |
| 2008/0164640 A1* | 7/2008 | Pruitt | B62B 3/1496 264/513 |
| 2009/0058024 A1* | 3/2009 | Cagan | B62B 3/1468 280/33.991 |
| 2009/0301533 A1 | 12/2009 | Caldwell | |
| 2010/0276899 A1 | 11/2010 | Burdwood et al. | |
| 2013/0307235 A1 | 11/2013 | Smith et al. | |
| 2014/0159327 A1* | 6/2014 | Smith | B62B 3/14 280/33.991 |
| 2015/0053652 A1* | 2/2015 | Peters | B62B 3/14 219/78.16 |
| 2020/0216105 A1* | 7/2020 | McMurtrey | B62B 3/002 |
| 2020/0247451 A1 | 8/2020 | Streicher | |
| 2021/0140513 A1 | 5/2021 | Bujold | |
| 2022/0111883 A1* | 4/2022 | Yuan | B62B 5/0009 |
| 2022/0306176 A1* | 9/2022 | Zutler | B62B 3/18 |
| 2023/0047785 A1* | 2/2023 | Zutler | B62B 3/1492 |
| 2023/0143479 A1 | 5/2023 | Hagen | |
| 2023/0146179 A1 | 5/2023 | Hagen | |
| 2023/0147385 A1 | 5/2023 | Hagen | |
| 2024/0132132 A1* | 4/2024 | Pedersen | B62B 3/1492 |
| 2024/0140511 A1 | 5/2024 | Pedersen | |
| 2024/0199105 A1* | 6/2024 | McIntosh | B62B 3/1444 |
| 2024/0343284 A1 | 10/2024 | Fitzwater et al. | |

FOREIGN PATENT DOCUMENTS

| | | |
|---|---|---|
| IN | 210446 | 6/2009 |
| WO | D083472001 | 5/2014 |
| WO | 2014144880 A2 | 9/2014 |

OTHER PUBLICATIONS

Have you used Target's new wonderful shopping carts in Texas yet?, article published Aug. 22, 2023, https://knue.com/did-you-see-targets-wonderful-new-shopping-carts-have-made-it-to-texas/ (Year: 2023).

"Gray All Plastic Full Size Grocery Shopping Cart", printed from https://www.specialtystoreservices.com/productdetails.aspx?produ...-s9z2T4rR_SAgKfk6tDm5as9flTpzy6xZsH1dpQtU6IQsZueMhoC_n0QAvD_BwE, printed on Apr. 27, 2021 (1 page).

"Side-Panel Graphics" printed from https://www.bemisretailsolutions.com/features.html, publicly available as soon as Aug. 15, 2020, per Internet Archive Wayback Machine at https://web.archive.org (6 pages).

U.S. Appl. No. 18/383,834, filed Oct. 25, 2023, and claiming priority to Oct. 25, 2022 (30 pages).

U.S. Appl. No. 29/857,746, filed Oct. 25, 2022 (12 pages).

U.S. Appl. No. 29/857,751, filed Oct. 25, 2022 (20 pages).

U.S. Appl. No. 18/383,860, filed Oct. 25, 2023, and claiming priority to Oct. 25, 2022 (35 pages).

U.S. Appl. No. 18/383,865, filed Oct. 25, 2023, and claims priority to Oct. 25, 2022 and Oct. 26, 2022 (43 pages).

U.S. Appl. No. 18/383,870, filed Oct. 25, 2023, and claims priority to Oct. 25, 2022 and Oct. 27, 2022 (36 pages).

U.S. Appl. No. 29/857,743, filed Oct. 25, 2022 (17 pages).

U.S. Appl. No. 29/857,763, filed Oct. 25, 2022 (10 pages).

U.S. Appl. No. 29/857,773, filed Oct. 25, 2022 (10 pages).

U.S. Appl. No. 29/857,775, filed Oct. 25, 2022 (17 pages).

U.S. Appl. No. 29/857,777, filed Oct. 25, 2022 (17 pages).

U.S. Appl. No. 29/857,778, filed Oct. 25, 2022 (19 pages).

(56)        References Cited

OTHER PUBLICATIONS

U.S. Appl. No. 29/857,781, filed Oct. 25, 2022 (47 pages).
U.S. Appl. No. 29/857,782, filed Oct. 25, 2022 (4 pages).
Flicker Target Cart, date published Nov. 30, 2016 [online], [site visited Jul. 22, 2025]. Available from internet, URL: <https://www.flickr.com/photos/thetransitcamera/30524910294/in/photostream/> (Year: 2016).
Google About This Image / ALAMY Target Cart, date published Oct. 28, 2021 [online], [site visited Jun. 30, 2025]. Available from Internet; URL (Year: 2021).
Google About This Image / Premier Carts APFS All Polymer Large Full Size Plastic Retail Shopping Carts, date published May 30, 3030 [online], [site visited Jul. 22, 2025]. Available from internet, URL: <https://tinyurl.com/yjyedxuu> (Year: 2020).
Google About this Image/ Rehabmart Accessories for Crocodile Gait Trainer, date published Oct. 2, 2021 [online], [site visited Jun. 30, 2025] Available from Internet, URL https://tinyurl.com/4x5mrb8r> (Year 2021).
Target Toy Shopping Cart, date first available Aug. 18, 2022 [online], [site visited Jun. 30, 2025], Available from internet, URL: <https://www.amazon.co.jp/-/en/Target-Toy-Shopping-Cart/dp/B07F9W1Z23> (Year: 2022).

* cited by examiner

SHOPPING CART WITH LIFTING FENDER

CROSS-REFERENCE TO RELATED APPLICATIONS

This non-provisional utility application is related to and claims priority under 35 U. S. C. 119(e) to U.S. Provisional Patent Application No. 63/419,327, filed Oct. 25, 2022, which is incorporated herein by reference.

BACKGROUND OF THE INVENTION

Stores around the world maintain fleets of shopping carts to facilitate a customer's selection, transport, and purchase of goods within those stores. Over many decades, the shape and size of shopping carts have changed to meet different models of shopping. Retailers devote considerable resources to shaping a customer's experience within a retail store to make shopping easier, more comfortable, and attractive. The impact of shopping carts on that experience is often overlooked. In order to make an attractive and/or sturdy shopping cart, a shopping cart may be formed of one or more of various materials such as wire, metal, or plastic, such as a thermoplastic resin. Different cart designs make different use of these materials as designers see fit to make functional and visually appealing shopping carts.

Each individual retail store typically employs the use of a fairly large number of shopping carts to serve its shoppers. Storage of the shopping carts is not only cumbersome but can also be problematic as it can require a large amount of space. As such, any manner of storing the shopping carts that minimizes space requirements, preferably without taking a meaningful toll on the aesthetics and/or structural integrity of the shopping carts, can be beneficial. In some instances, horizontal stacking of shopping carts, in which several shopping carts are pushed one inside the other, for example, to fit at least partially within the basket of the other, to form a front-to-back stack of shopping carts having a collective footprint smaller than the same number of shopping carts would collectively have if they were not so stacked.

SUMMARY

A shopping cart for use with at least one other cart to form a horizontal stack of shopping carts. The cart includes a support frame, a basket, and a lifting fender. The support frame includes a chassis and support masts extending substantially vertically upwardly from the chassis. The chassis is coupled to front wheels and rear wheels and includes a rear cross bar extending laterally across the chassis and positioned between the front wheels and the rear wheels. The front wheels and rear wheels are longitudinally spaced from each other. The basket is supported by the support masts over the chassis and defines a compartment. The lifting fender is formed separately from the support frame and is selectively coupled to an underside of the rear cross bar. The lifting fender defines a lift section extending below a remainder of the rear cross bar and defines a bottom surface configured to be the initial contact point for a second, rear shopping cart when the horizontal stack of shopping carts is formed, such that contact between the second, rear shopping cart and the lifting fender generally decreases contact between the second, rear shopping cart and the rear cross bar. Other carts, cart assemblies, stacks of carts, lift inducing members and associated methods are also described herein.

BRIEF DESCRIPTION OF THE DRAWINGS

Embodiments of the invention will be described with respect to the figures, in which like reference numerals denote like elements, and in which.

DETAILED DESCRIPTION

Figure 1:
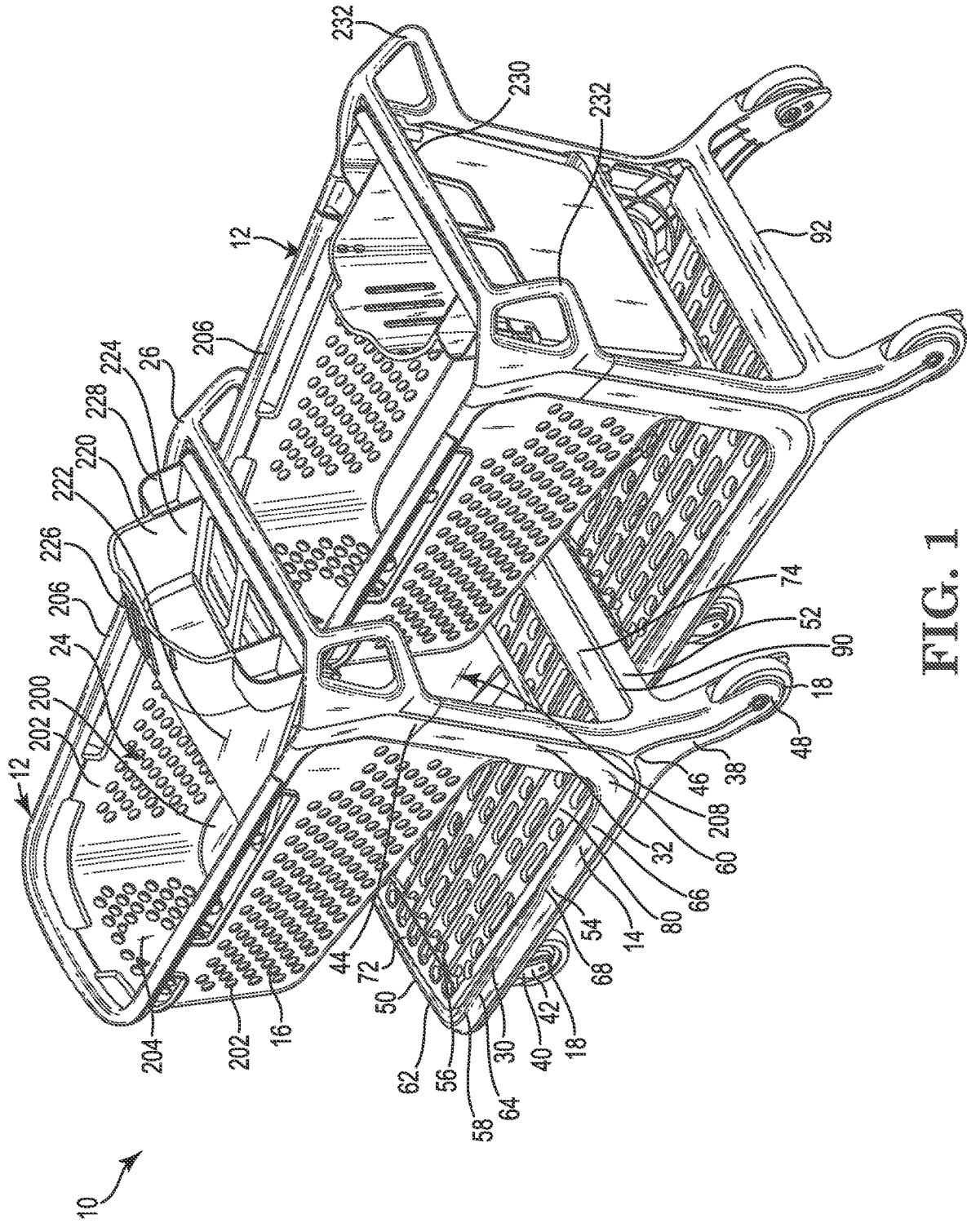
FIG. 1 is a right side and rear perspective view illustration of a horizontal stack of shopping carts consisting of two shopping carts, according to an embodiment of the invention.

The following detailed description of the invention provides example embodiments and is not intended to limit the invention or the application and uses of the invention. Furthermore, there is no intention to be bound by any theory presented in the preceding background of the invention or the following detailed description of the invention. Relational terms herein such a first, second, top, bottom, etc. may be used herein solely to distinguish one entity or action from another without necessarily requiring or implying an actual such relationship or order. Directional terminology, such as "front," "back," "leading," or trailing is used with reference to the orientation in the figure(s) being described. Any directional terminology is used for purposes of illustration and is in no way limiting. In addition, as used herein, the terms "about" or "substantially" apply to all numeric values or descriptive terms, respectively, and generally indicate a range of numbers or characteristics that one of skill in the art would consider equivalent to the recited values or terms, that is, having the same function or results.

Embodiments of the invention are directed to a cart, such as a shopping cart, having front wheels and rear wheels. The cart is configured to be horizontally stacked with other similar carts, wherein upon horizontal stacking two carts, the rear wheels of the front of the two carts are lifted off the ground to allow the two carts to be stacked more snugly together and to allow both carts to be steered or otherwise manipulated by a user pushing the rear such cart. Each of the carts includes a lifting fender on a lower portion of the frame thereof facing downwardly away from the basket and toward a supporting surface, such as the ground or the floor, below the cart. The lifting fender extends further below the frame than portions of the frame immediately surrounding the lifting fender such that the lifting fender is positioned and sized to contact a top of a frame or chassis member of the rear of the two carts upon horizontal stacking. The interaction between the lifting fender of the front cart and the top of the frame or chassis member of the rear cart lifts the rear wheels of the front cart as the two carts are moved together until the rear wheels are no longer in contact with the supporting surface below.

The lifting fender generally is the part of the front cart that takes on contact with the rear cart in a manner that general prevents or at least decreases interaction between the rear cart and any other portions of the front cart. This limited interaction with the front cart reduces wear and tear on the front cart. In one embodiment, the lifting fender is a separately formed piece that is selectively couplable with an underside of the frame of the front cart. In one example, if the lifting fender is worn down or damaged, the lifting fender is removed from the front cart and is replaced with a new or another lifting fender so as to limit damage to other parts of the cart upon horizontal cart stacking, more specifically, upon interaction between the front cart and adjacent rear cart in the horizontal stack. In one example, the frame of the cart and/or the lifting fender is formed of plastic, for instance, is formed from a thermoplastic resin or similar material, as will be apparent to those of skill in the art upon reading the present application.

Figure 2:
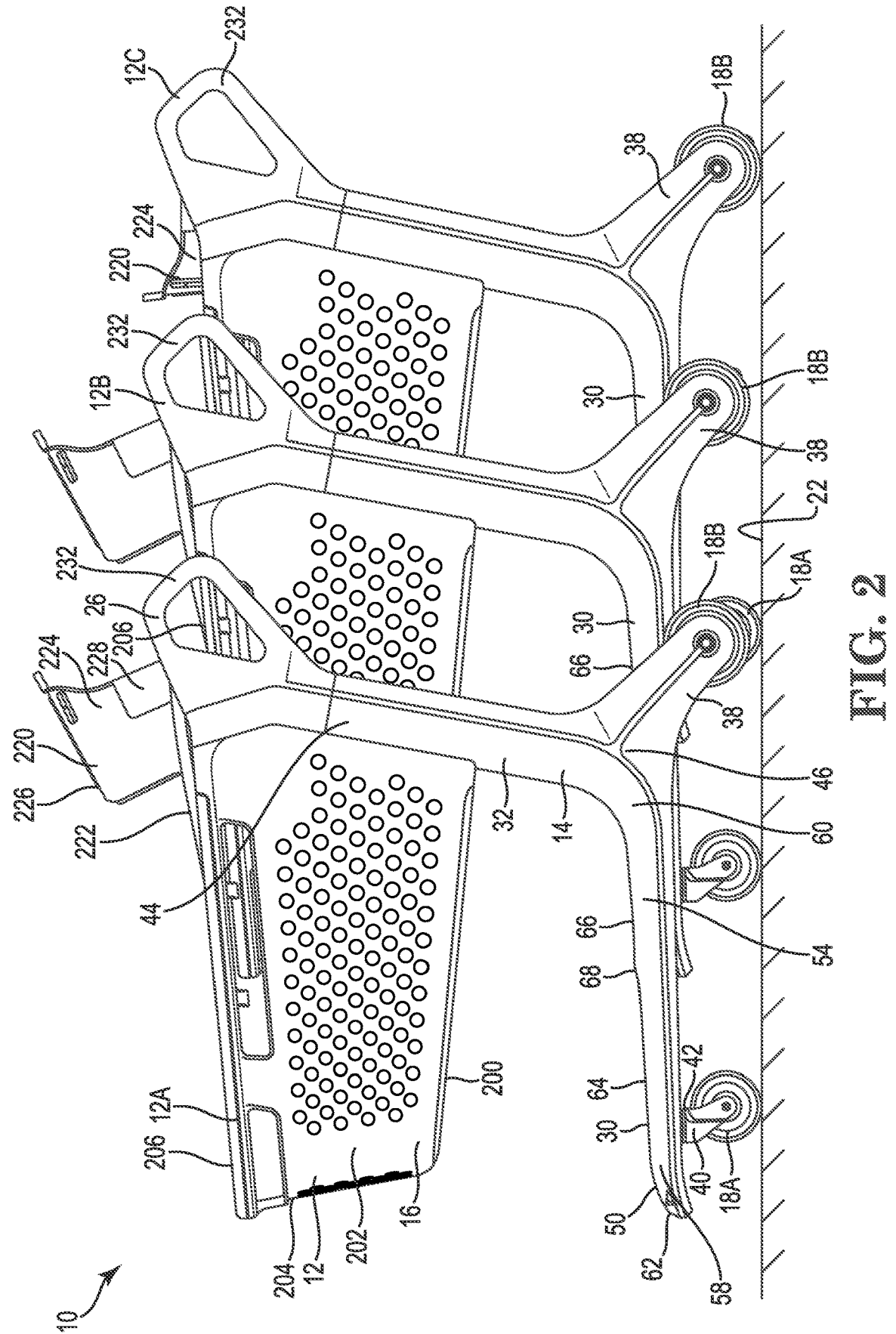
FIG. 2 is a right side view illustration of a horizontal stack of shopping carts consisting of three shopping carts, according to an embodiment of the invention.
Figure 3:
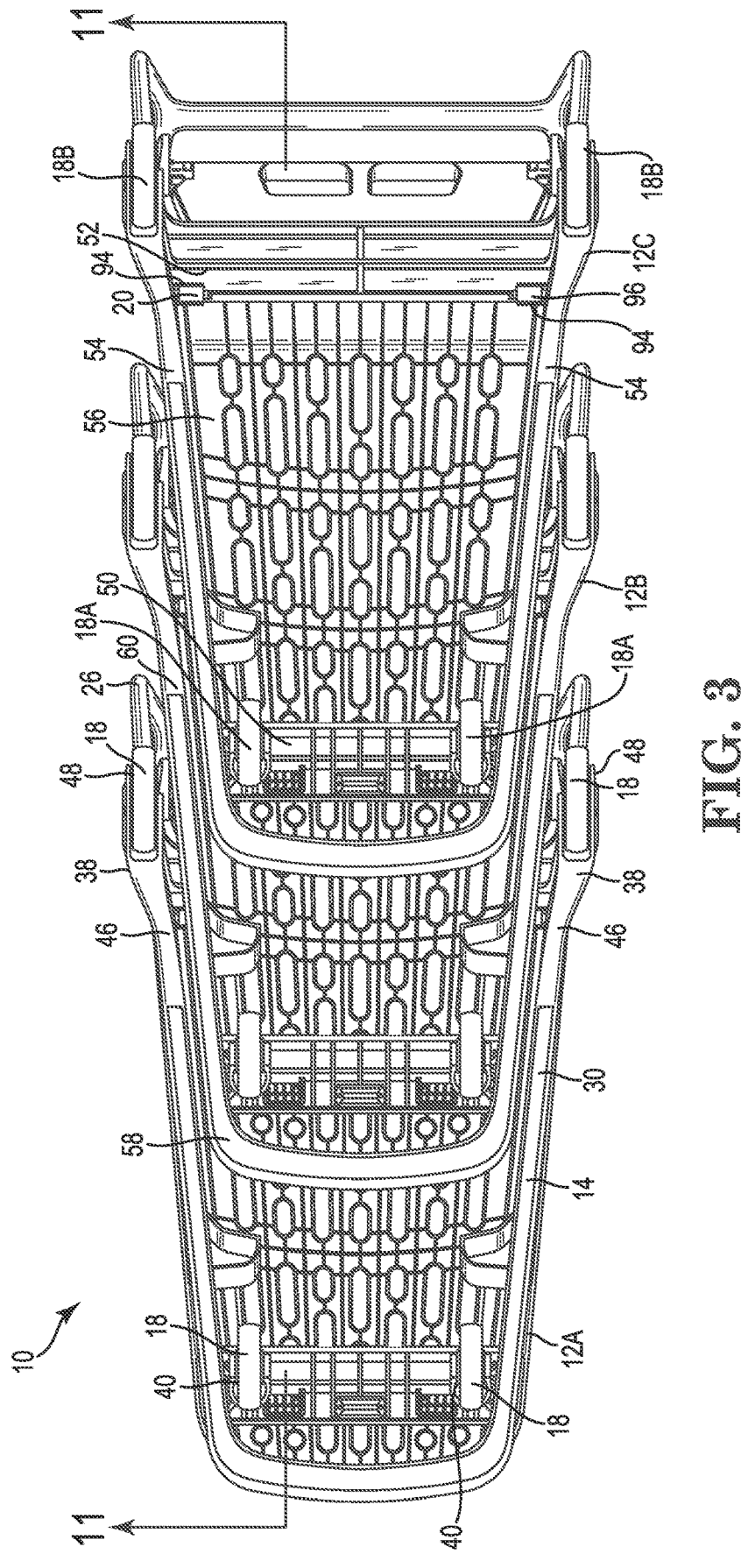
FIG. 3 is a top view illustration of the horizontal stack of shopping carts of FIG. 2, according to an embodiment of the invention.

Turning to the figures, FIGS. 1-3 illustrate examples of stacked cart systems 10 each including two or more carts, such as two or more shopping carts 12 horizontally stacked together, according to embodiments of the invention. When the two or more shopping carts 12 of the stacked cart system 10 are horizontally stacked, the two or more shopping carts 12 have an overall footprint that is less than the collective footprint the two or more shopping carts 12 would have unstacked.

Each of the two or more shopping carts 12 may have any variety of forms, but in the illustrated embodiments, each shopping cart 12 includes a support frame 14, a basket 16 supported by support frame 14, wheels 18 extending downwardly from support frame 14 for contacting a support surface 22 (see FIG. 2) below, such as the ground or a floor, and a lifting fender 20. In one embodiment, the two or more shopping carts 12 are each very similar or substantially identical shopping carts 12 and/or when stacked, at least some of wheels 18 of a front one of the two or more shopping carts 12 are lifted from the support surface 22 there below, as shown, for example, in FIG. 2. Per an embodiment of the invention, the lift of the front one of the two or more shopping carts 12 to move at least some of wheels 18 from support surface 22 is caused by interaction between the rear one of the two or more shopping carts 12 and the lifting fender 20 of the front one of the two or more shopping carts 12.

As illustrated, shopping cart 12 basket 16 is supported by support frame 14 while also cantilevering over a portion of support frame 14. Basket 16 defines at least three sides and defines a compartment 24 for holding items for a guest as they shop within a retail setting and/or as they transport items from the retail setting to and from his or her vehicle for transport to or from the retail setting. Shopping cart 12 may also include a handle assembly 26 at any one of various or multiple positions on shopping cart 12 to facilitate manipulating, e.g., pushing and/or pulling, and moving shopping cart 12. As used herein and illustrated in the drawings, the front of shopping cart 12 is the portion of basket 16 that generally leads shopping cart 12 during forward movement of shopping cart 12 induced by a user pushing on handle assembly 26 toward basket 16 from a position on shopping cart 12 opposite basket 16, and the rear of shopping cart 12 is the trailing portion of basket 16 or outside basket 16 opposite front of shopping cart 12 during the above-described forward movement of shopping cart 12, for example, including handle assembly 26.

In one example, support frame 14 includes a base or chassis 30 and two support masts 32. Chassis 30 generally extends horizontally in any desirable size and shape, for example, in a generally elongated trapezoidal shape and is positioned between basket 16 and wheels 18 forming the main support for shopping cart 12 above supporting surface 22, while support masts 32 extend generally upwardly from chassis 30 to support basket 16 in a position above chassis 30. In one embodiment, support masts 32 extend upwardly from near a rear of shopping cart 12 and basket 16 extends from masts 32 forwardly over and spaced above chassis 30.

In one embodiment, chassis 30 includes a front cross bar 50 and a rear cross bar 52, which are each spaced apart from one another and laterally extend across a substantial entirety of a width of the chassis 30, for example, between opposing longitudinally extending side struts 54 each extending from and between a front end 58 and a rear end 60 and, for example, between front cross bar 50 and rear cross bar 52. As illustrated with reference to FIG. 2, in one embodiment, front cross bar 50 extends between opposing side struts 54 with an angle orientation to form a rearwardly tapered ramped front surface 62 thereof.

Figure 11:
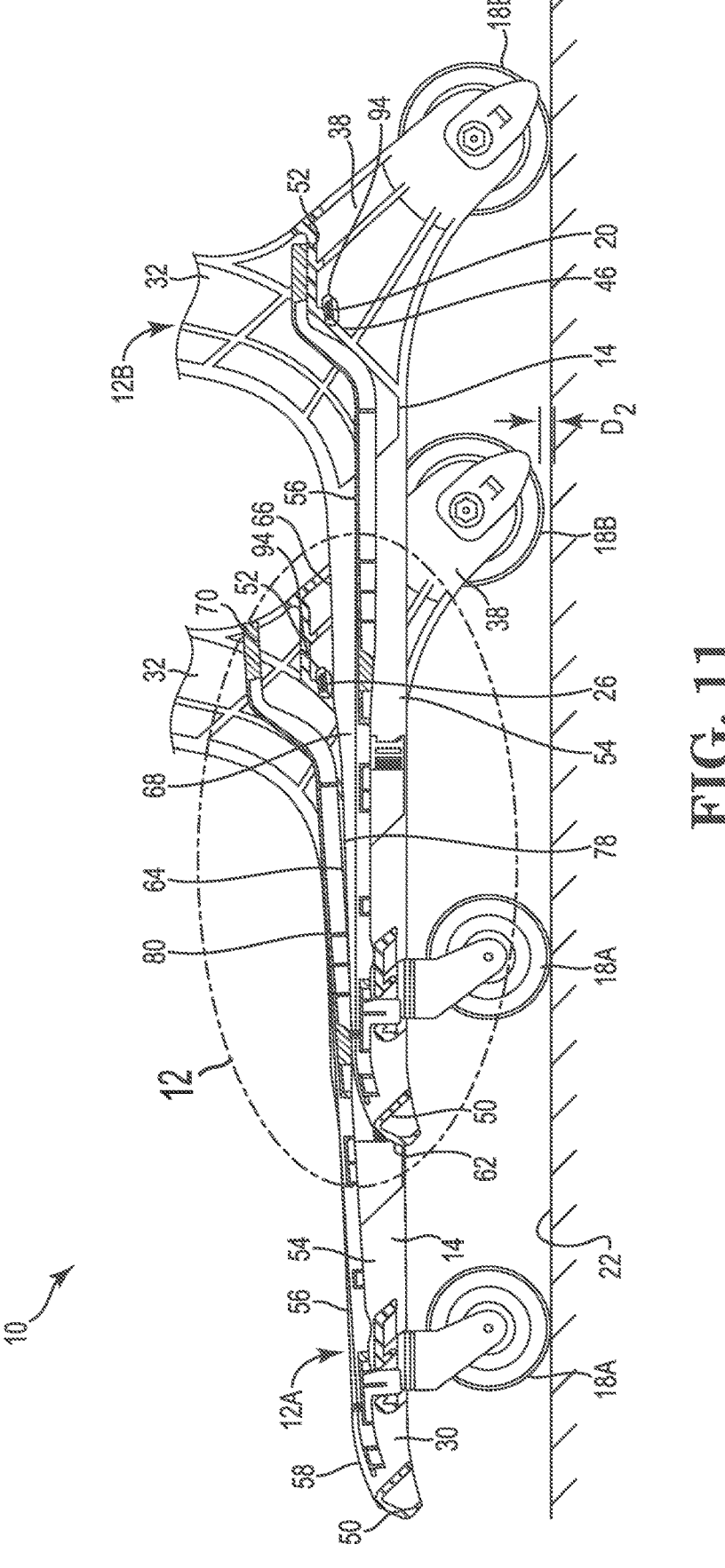
FIG. 11 is a cross-sectional view illustration of two of the shopping carts taken about the line 11-11 in FIG. 3, according to an embodiment of the invention.

Referring to FIGS. 1 and 2 and 11, in one embodiment, each of opposing side struts 54 defines a front section 64 and a rear section 66. Front section 64 of each side strut 54 extends from front end 58 to an intersection or transition 68, and rear section 66 of each side strut 54 extends from transition 68 to rear end 60. Front section 64 has a top to bottom height that is less than a top to bottom height of rear section 66, for example, by a first distance $D_1$, as shown with additional reference to FIG. 12. Transition 68 may be abrupt, but in another embodiment, is smooth forming a ramp or gradual transition between first section 64 and section 66 of one of the side struts 54.

In addition, since, in one embodiment, chassis 30 has a general trapezoidal shape, side struts 54 generally are not positioned to run parallel to each other, but instead taper away from each other as they extend from the front to the rear of shopping cart 12. In this manner a front of chassis 30 is less wide that a rear of chassis 30. In one example, shopping cart 12 includes two sets of wheels 18, that is, front wheels 18A and rear wheels 18B. Front wheels 18A are secured to chassis 30 within the overall footprint of chassis 30 near a front of chassis 30, in one example, via front legs 40, which may simply by casters 42, coupled to a bottom support of chassis 30. While in one example, support frame 14 includes two rear legs 38; each rear leg 38 extending rearwardly and/or outwardly, for instance, both rearwardly and outwardly as well as downwardly to support surface 22 from the intersection between chassis 30 and a different one of support masts 32 to a free end 48 where it is rotatably coupled with a rear wheel 18B. In this embodiment, rear wheels 18B are spaced apart from each other a considerably wider distance than front wheels 18A as most easily seen viewing the back shopping cart 12 in FIG. 3. This spacing of front wheels 18A narrower than rear wheels 18B facilitates horizontal stacking of shopping carts 12 as can be seen in FIG. 3 and as will be described in further detail below.

In one example, shopping cart 12 additionally includes a tray 56 supported by and positioned on top of chassis 30, namely partially by one or more of each of front cross bar 50, rear cross bar 52, and side struts 54. More specifically, tray 56 may include a front edge 72, a rear edge 74 opposite front edge 72, and opposing longitudinal sides of tray 56 each extending between front edge 72 and rear edge 74. Tray 56 may be substantially planar, have grooves, be solid, per perforated (e.g., to allow for drainage of any liquids or other items spilled on tray 56), or have any other suitable form. In one instance, tray 56 defines a bottom surface 78 facing toward support surface 22 and a top surface 80 facing in a direction opposite bottom surface 78.

In one embodiment, each of support frame 14, basket 16, handle assembly 26, and/or tray 56 are separately made exclusively of a plastic or other moldable material. This arrangement enables a lightweight cart while providing numerous structural, performance, and ergonomic functions. In another embodiment, one or more of support frame 14, basket 16, handle assembly 26, tray 56, and/or additional components of shopping cart 12 is/are made of a material other than a plastic material, such as metal or other suitable materials as will be apparent to those of skill in the art. In one embodiment, each of support frame 14, basket 16, handle assembly 26, and/or tray is made from the same one or different ones of a nylon material, a high-density polyethylene (HI)PE) material, or other moldable materials or mixtures of moldable materials and/or other non-moldable materials. Still further, use of wire, metal, or any other materials to completely or partially form any one or more of support frame 14, basket 16, handle assembly 26, and/or tray 56 are also contemplated as will also be apparent to those of skill in the art upon reading this application.

Figure 4:
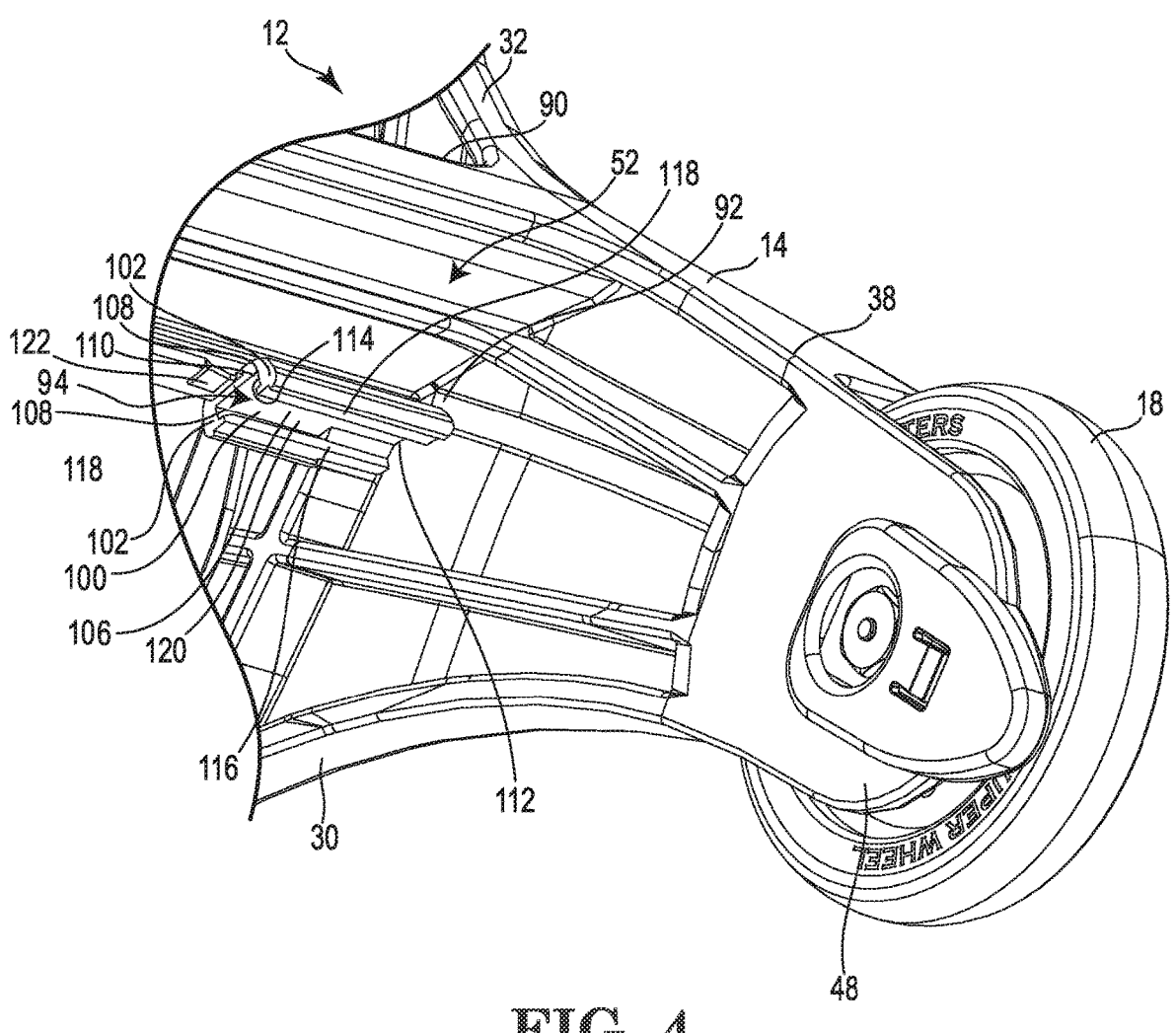
FIG. 4 is an enlarged perspective view illustration of underside portion of one of the shopping carts in FIG. 2 including a leg, a caster, and a reception channel for receiving a lifting fender, according to an embodiment of the invention.

In one example of rear cross bar 52 of chassis 30 is shown in additional detail with reference to the bottom perspective view of FIG. 4. As illustrated, rear cross bar 52 defines a top 90 and a bottom 92 facing in a direction opposite top 90, for example, facing toward support surface 22. A reception channel 94, for example, a laterally extending reception channel 94, is defined on bottom 92 of rear cross bar 52 and is sized and shaped to selectively receive and selectively couple with lifting fender 20. Reception channel 94 may be formed in a variety of manner, but in the illustrated embodiment, reception channel 94 includes a top panel 100, a side wall 102, and returns 116/118. Top panel 100 is positioned adjacent a bottom of rear cross bar 52 and defines a bottom surface 106 facing inwardly to and forming a portion of the reception channel 94. In one example, bottom surface 106 is substantially planar.

Top panel 100 is defined between opposing laterally extending edges 108 that intersect side walls 102. More particularly, in one example, one of each of side walls 102 extends along a different one of laterally extending edges 108, such that interior facing surfaces 114 of each side wall 102 forms and faces reception channel 94 with bottom surface 106 of top panel 100. In one embodiment, one or both ends of reception channel 94 remain open, for instance defining first open end 110 facing toward the opposite longitudinal side of shopping cart 12, and second open end 112 facing toward the nearest longitudinal side of shopping cart 12. Each of side walls 102 may be capped with a rib or return 116 or 118 opposite top panel 100 that extends inwardly toward the other of side walls 102 forming a cap over each of interior facing surface 114 immediately adjacent reception channel 94 opposite top panel 100, in one example. In the manner described, in one instance, reception channel 94 is formed with a C-shaped cross-section with a bottom opening 120 between return 116 and return 118.

In one example, a locking feature 122 is formed adjacent one of the open ends of reception channel 94, for instance, first open end 110. Locking feature 122 is configured to selectively receive a portion of lifting fender 20, in a manner that will be further described below, such that lifting fender 20 will be less likely to be inadvertently knocked loose from its desired location. In this manner, "locking" is used here to mean more securely seated and not necessarily affixed in a manner requiring a key, tool, combination, or similar to remove. In one embodiment, locking feature 122 is an indentation sized to receive a corresponding portion of lifting fender 20 while in other embodiments locking feature 122 may be a protrusion designed to fit within a receiving cavity, slot, or aperture of lifting fender. Other locking features 122 will be apparent to those of skill in the art upon reading the present application.

FIG. 5-9 collectively illustrate one example of lifting fender 20 according to an embodiment of the present invention. Lifting fender 20 as illustrated includes a coupling panel 130 and a lift section 132 coupled to or formed contiguous with one another. Coupling panel 130 is generally sized and shaped to be selectively, in one example, slidably, received within reception channel 94. Lift section 132 is configured, in one embodiment, to protrude from coupling panel and from reception channel 94 to extend below rear cross bar 52 of chassis 30 in a position configured to interact with side struts 54 of another shopping cart 12 during horizontal stacking and to generally prevent or at least decrease direct interaction between side struts of the other shopping cart 12 and the rear cross bar 52 during horizontal stacking.

More specifically, coupling panel 130 is generally sized and shaped similar to reception channel 94 at least for a majority thereof, in one example. Coupling panel 130 defines a first long end 134, a second long end 136 opposite first long end 134 and opposing lateral edges 138 each spaced from each other and extending between first long end 134 and second long end 136. In one example, a locking tab 140 or other second locking feature extends from first long end 134 of coupling panel 130 to a free end 150. Locking tab 140 and coupling panel 130 collectively define a top surface 152, for example, a substantially planar top surface 152, in one example. Locking tab 140 is smaller front to back (as it will be installed on shopping cart 12) between sidewalls than coupling panel 130, in one embodiment, such that transition shoulders 144 are formed as lift fender 20 changes from the coupling panel 130 to the smaller locking tab 140.

Locking tab 140 defines a rib 154 extending upwardly from top surface 152 between coupling panel 130 and free end 150, in one embodiment. Rib 154 or other locking feature is configured to selectively lock with locking feature 122 of chassis 30, more particularly, rear cross bar 52, for example, fit within the indentation thereof.

In one embodiment, an intermediate section 160 is defined by lifting fender 20 and extends between a top 168, adjacent coupling panel 130, and a bottom 170, adjacent lift section 132, to separate coupling panel 130 and lift section 132 slightly and is configured to fit between the gap formed between the two returns 116 and 118. Intermediate section 160 defines opposing lateral sides 166 each extending laterally between first end 162 and second end 164 thereof.

Since intermediate section 160 is smaller in front to back thickness that either coupling panel 130 or lift section 132, and indentation or slot 172 is formed on either side of intermediate section 132 between lift section 132 and lift section 132.

Figure 5:
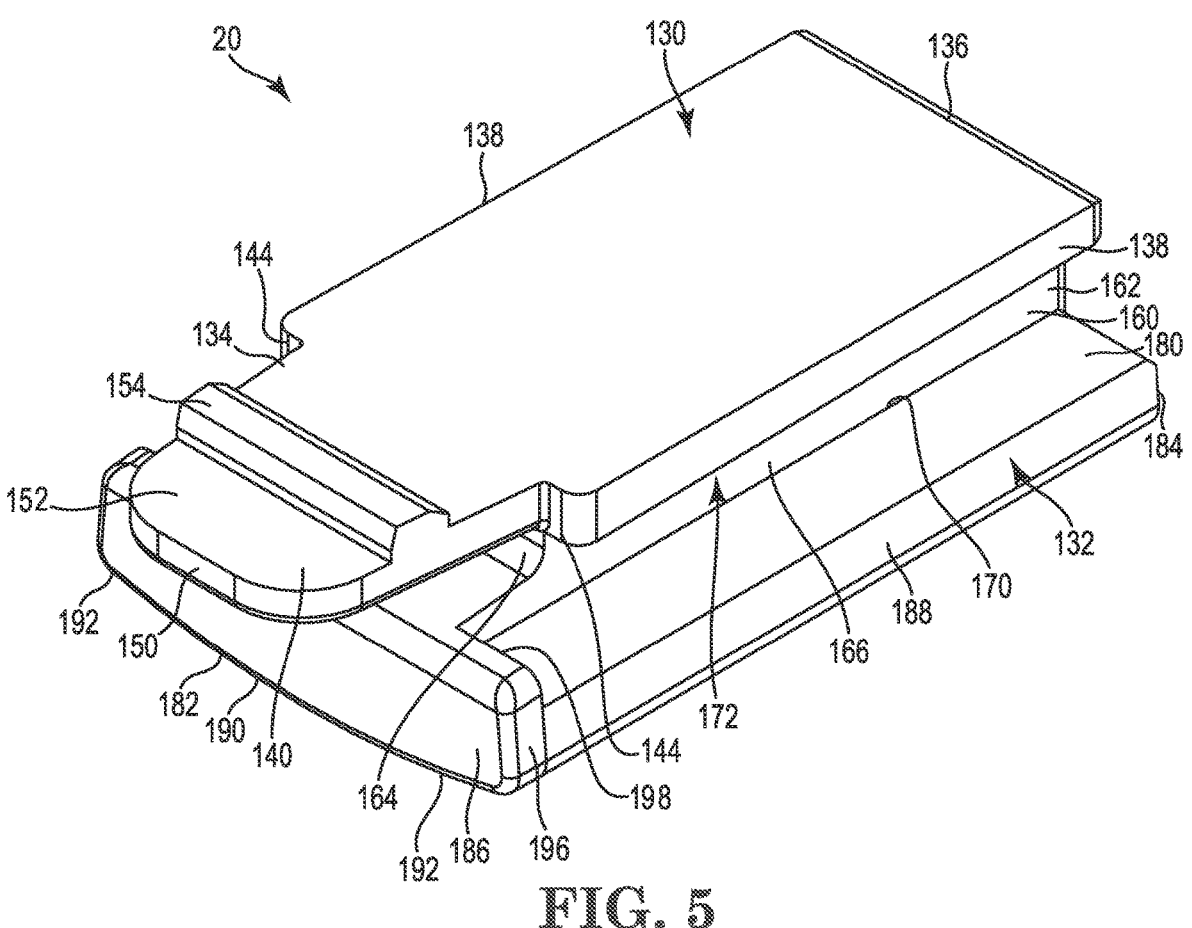
FIG. 5 is a top, rear perspective view illustration of a lifting fender, according to an embodiment of the invention.
Figure 6:
FIG. 6 is a left side view illustration of the lifting fender of FIG. 5, according to an embodiment of the invention.
Figure 6:
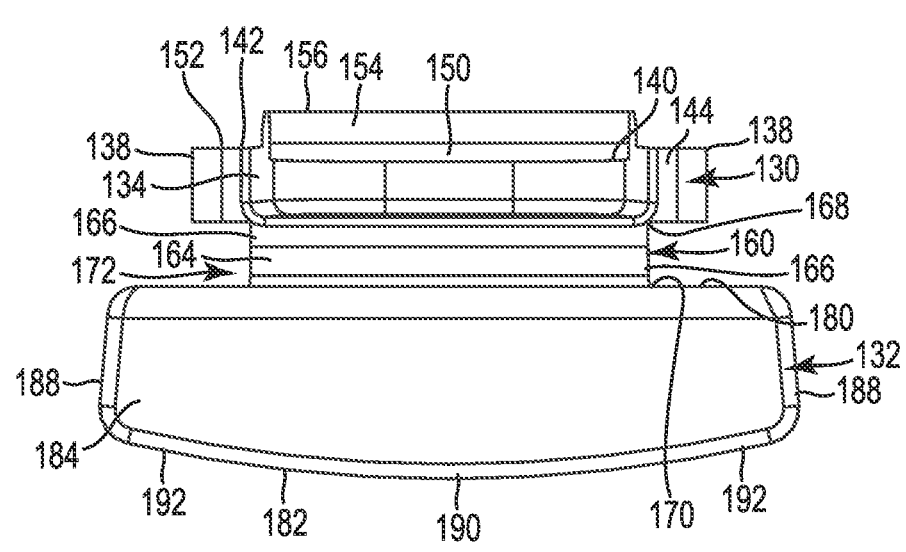
Figure 7:
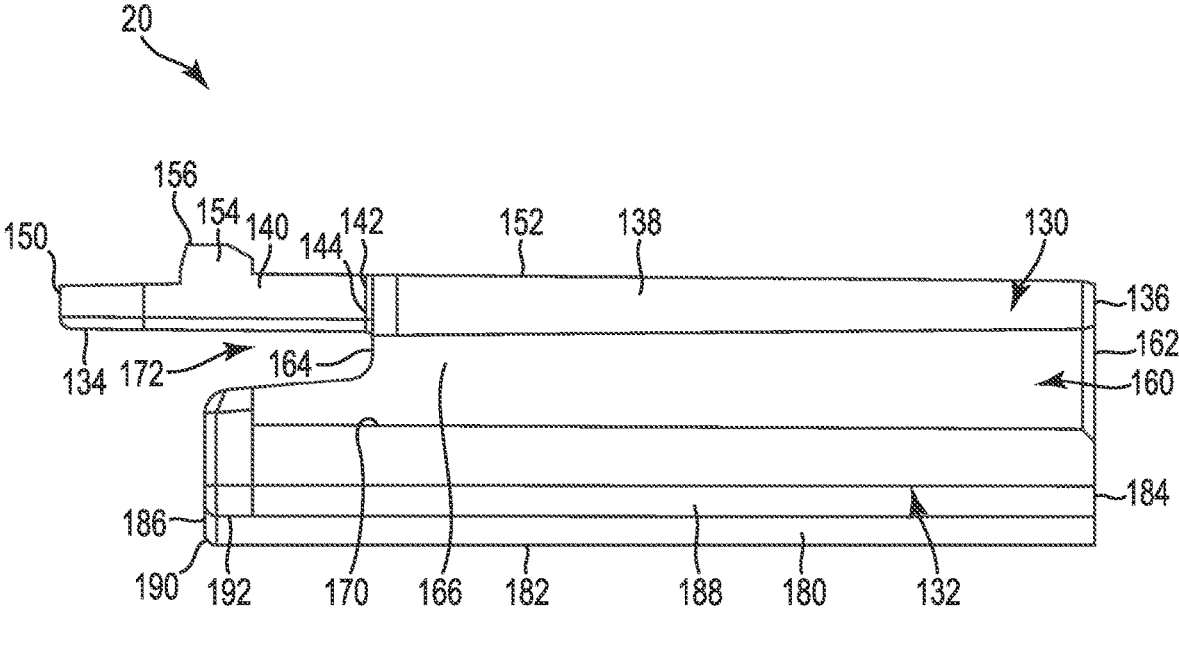
FIG. 7 is a rear view illustration of the lifting fender of FIG. 5, the front view being a mirror image of the rear view, according to an embodiment of the invention.
Figure 8:
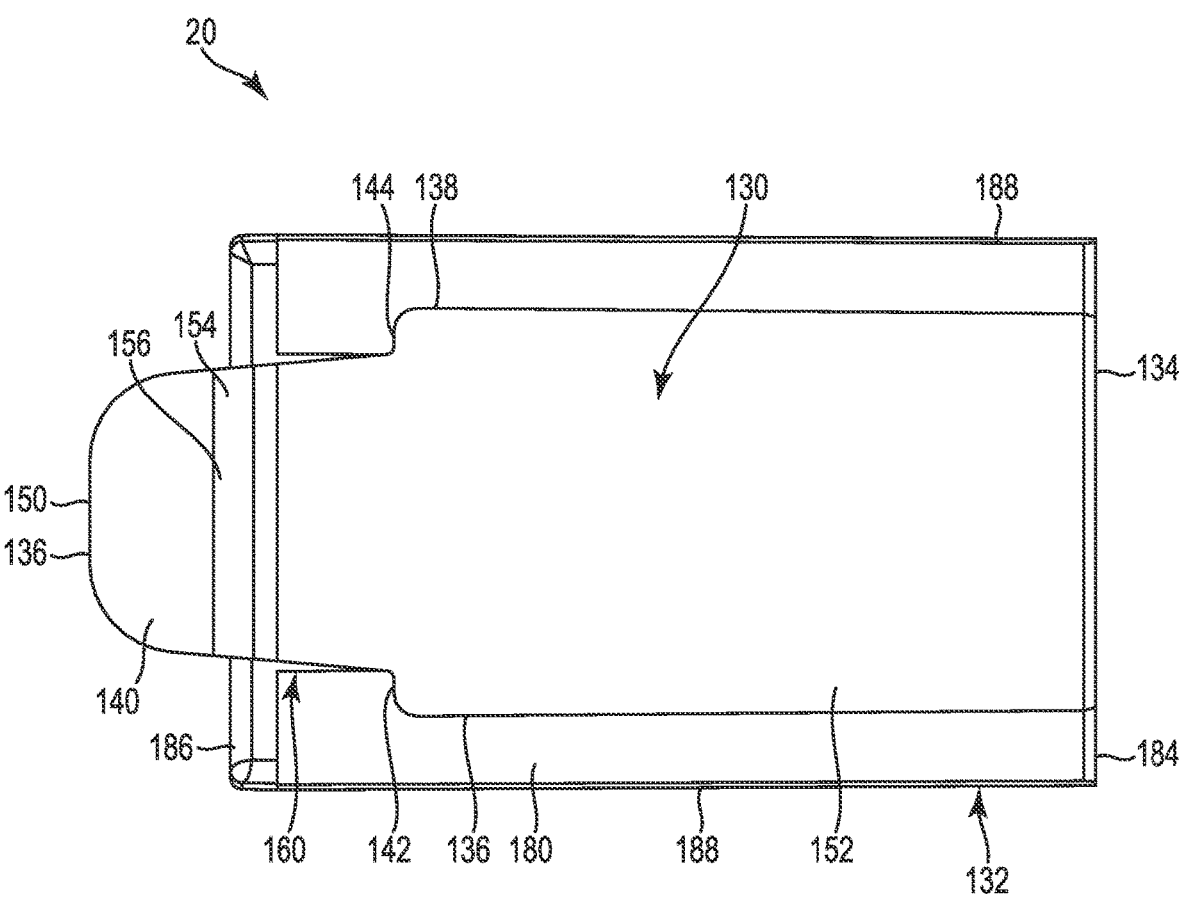
FIG. 8 is a top view illustration of the lifting fender of FIG. 5, according to an embodiment of the invention.
Figure 9:
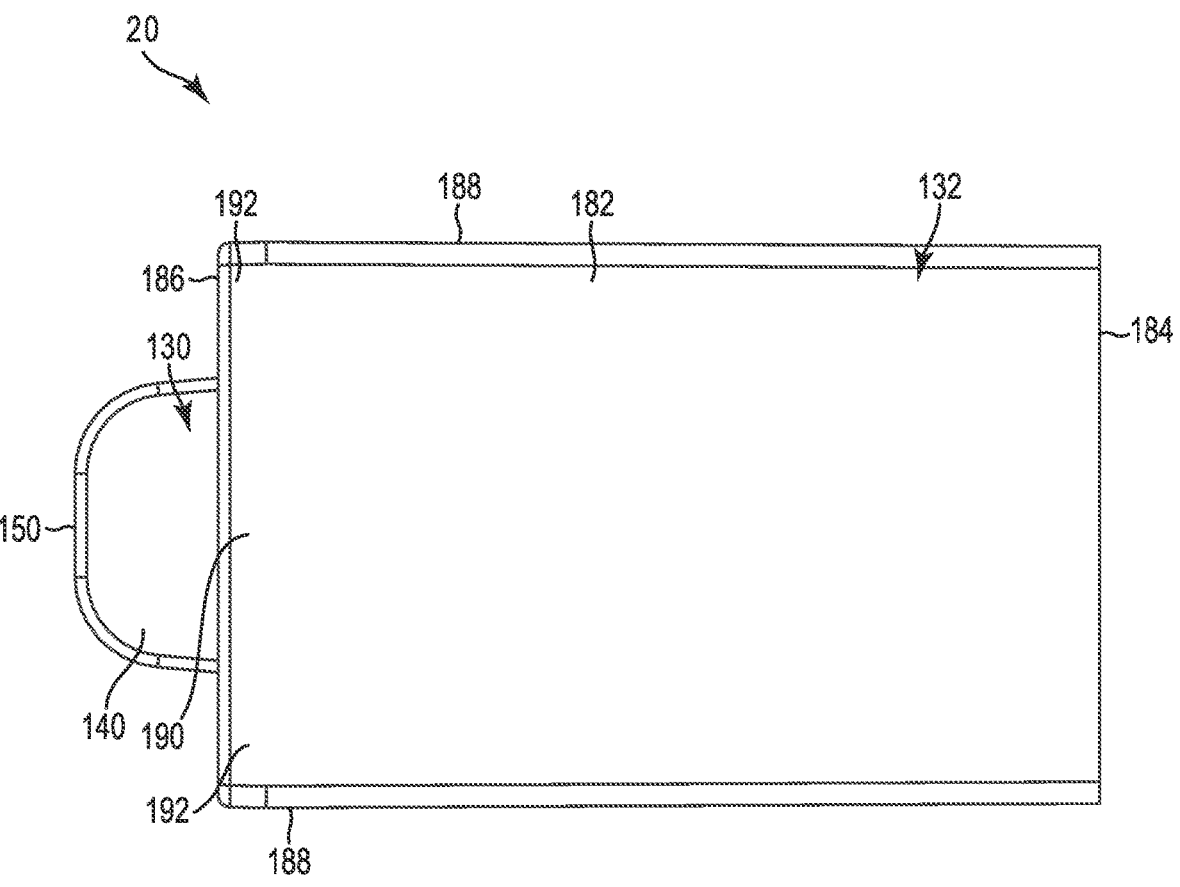
FIG. 9 is a bottom view illustration of the lifting fender of FIG. 5, according to an embodiment of the invention.

Lift section 132 extends with a bigger front to back girth than either coupling panel 130 or intermediate section 160, in one example, and may be large enough to cover a substantial entirety of a bottom of the structure defining reception channel 94. In one embodiment, lift section 132 includes a top surface 180, a bottom surface 182 facing opposite top surface 180, a first end 184, a second end 186 opposite first end 184, and opposing lateral sides 188. A step up or end cap 196 is formed at first end of lift section 132, in one example, and extends upwardly higher than top surface 180 defined by a remainder of lift section 132 to define an upwardly extending stop surface 198 adjacent and substantially perpendicularly to top surface 180 as shown in FIG. 5. First end 184 of lift section 132 is defined by end cap 196 and is concave such that a middle portion 190 thereof extends further outwardly away from second end 186 than the two side portions 192 on either side of middle portion 190.

Figure 10:
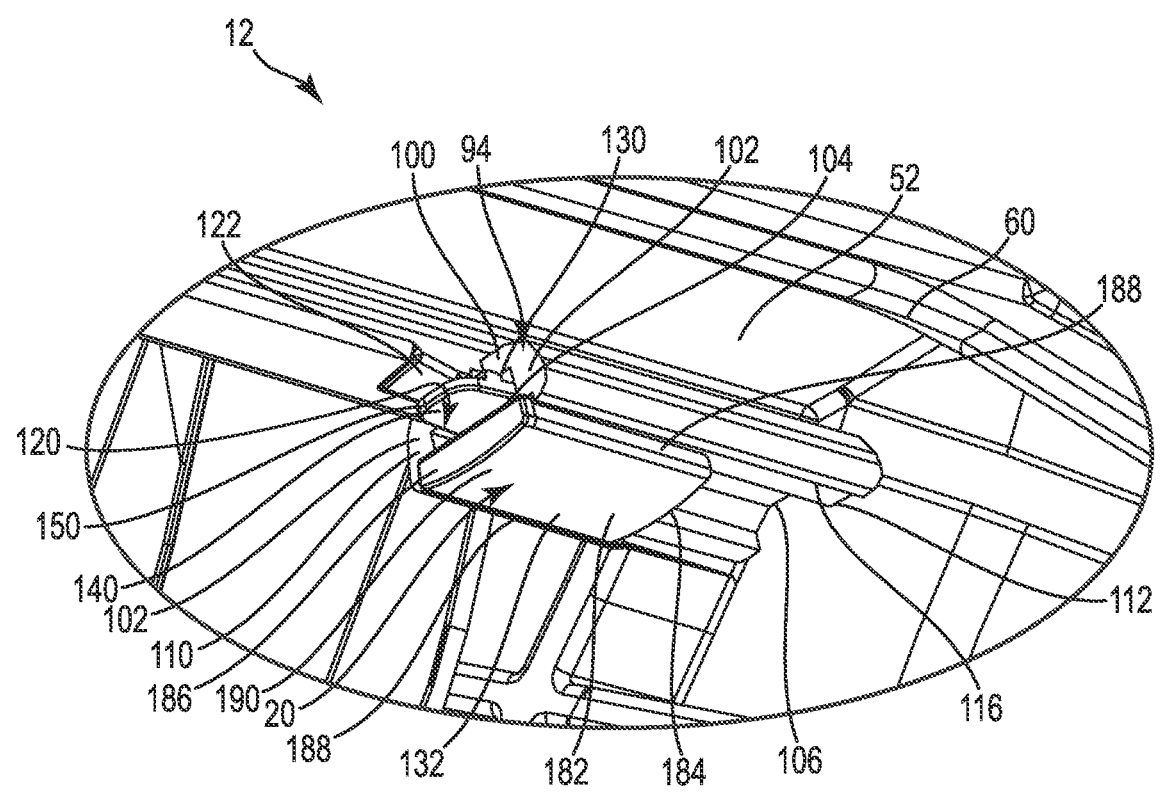
FIG. 10 is bottom perspective view illustration of a portion of the shopping cart frame and the lifting fender of FIG. 5, according to an embodiment of the invention.

During use, lifting fender 20 (e.g., see FIGS. 5-9) is slide partially into reception cavity 94 (e.g., see FIG. 4), resulting in the assembly shown in FIG. 10 per one example of the present invention. As shown, collectively referring to FIGS. 4-10, with coupling panel fitting snuggling in reception channel 94, intermediate section 160 extending out of reception channel 94 and lift section 132 extending below reception channel 94 and all of rear cross bar 52 at least the entire thickness of lift section 132, in one example.

Broadening out our viewpoint to how lifting fender 20 facilitates horizontal stacking of shopping carts 12, we additionally look to FIGS. 1-3. As discussed, each shopping cart 12 for stacking includes basket 16. For our discussion, in the illustrated embodiment, we note that each basket 16 includes a bottom panel 200, side panels 202 on either longitudinally extending side thereof, a front panel 204 extending upwardly from bottom panel 200 and between fronts of the two side panels 202 to define compartment 24 therebetween. In one example, each of bottom panel 200, side panels 292, and front panel 204 are positioned on shopping cart 12 to be statically positioned relative to each other and to support frame 14. A top mouth 206 open to compartment 24 is collectively defined by the two side panels 202 and front panel 204, and an open rear end 208 is defined between the two side panels 202 and the bottom panel 202 opposite front panel 204.

In one example, shopping cart 12 includes a gate and seat assembly 220 supported on one of support masts 32, basket 16, handle assembly 26, or other portion of shopping cart 12. Gate and seat assembly 220 is, in one embodiment, positioned at a rear end of basket 16, for example, selectively closing off an otherwise open rear end 208 of basket 16. Gate and seat assembly 202 includes a gate 222 and, in one example, a seat 224 configured to selectively provide seating for a small child and/or to receive smaller items, such as a user's bag or purse, small items for purchase, etc. As illustrated, gate 222 is rotatably coupled with a top of basket 16 in a manner allowing gate 222 to rotate about the coupling the selectively, substantially cover open rear end 208 of compartment 24 and/or to extends into and/or above rear compartment 24. In one aspect, gate and seat assembly 220 is configured to be pivoted upward within basket 16 to enable nesting multiple carts 12 together as will be apparent to those of skill in the art upon reading the present application as shown in FIGS. 1-3.

Gate 222 and seat 224 may be formed as a single, integral member or may be formed as separate pieces coupled to one another. In one example, seat 224 extends forwardly from gate 222 to cantilever from gate 222 into and/or over a portion of compartment 24 of basket 16. Seat 224 can be formed in a variety of manners, in one example, to define a backrest 226 of seat 224 generally opposite a rear surface of gate 222. In one embodiment, gate and seat assembly 220 additionally includes at least one integrally molded or otherwise formed cup holder 228, for example, one on either side of seat 224.

Handle assembly 26 also is contemplated as taking on many different forms as will be apparent to those of skill in the art. For example, as illustrated, handle assembly 26 includes a laterally extending, substantially horizontal handle 230 as well as two opposing side handles 232 atop each support mast 32 at a top edge 44 thereof. In other embodiments, handle assembly 26 only includes one of substantially horizontal handle 230 and side handles alone and/or in combination with other handles that will be apparent to those of skill in the art upon reading the present application.

Figure 12:
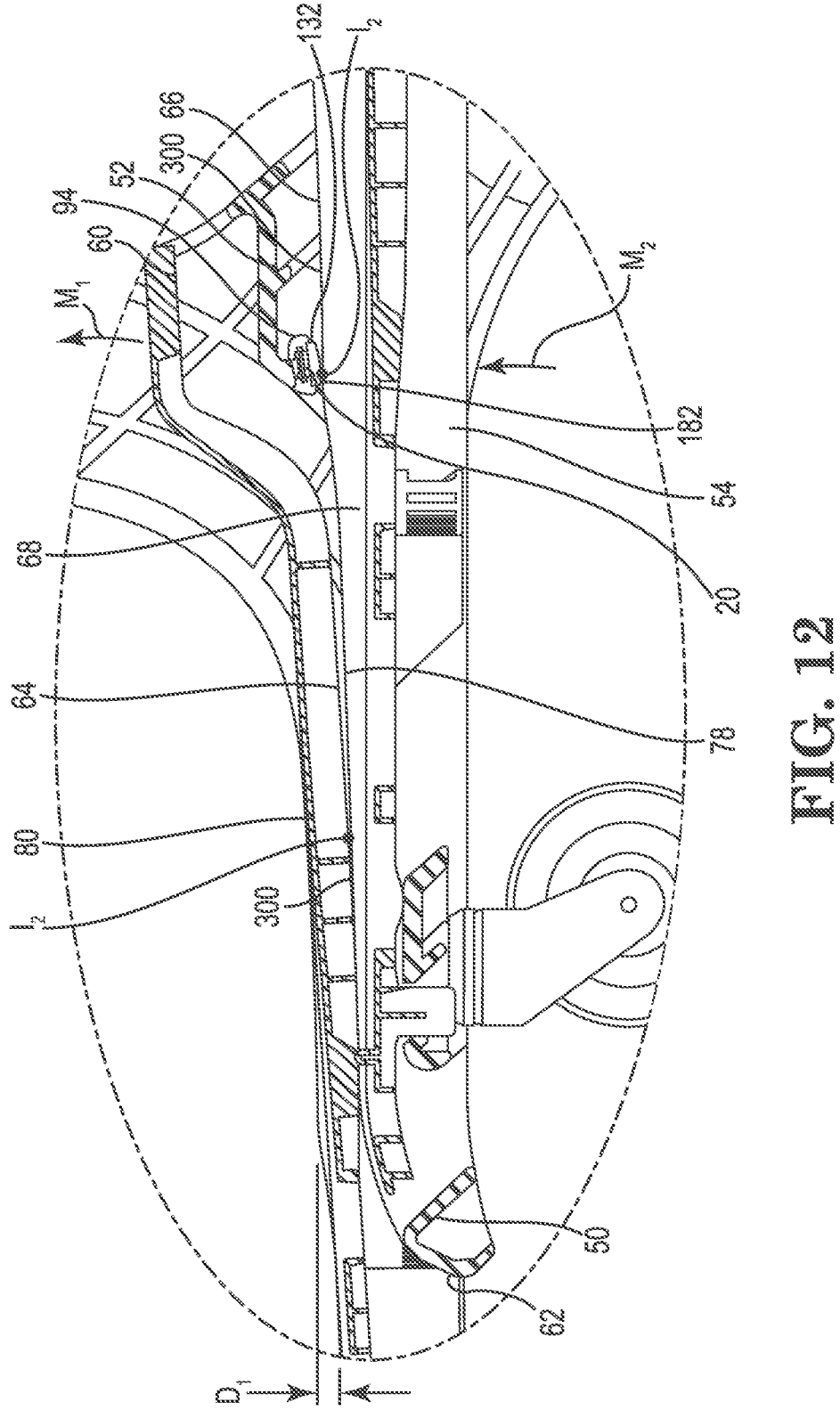
FIG. 12 is an enlarged, illustration of the portion of FIG. 11 indicated by the enlarged numeral 12, according to an embodiment of the invention.

During stacking of shopping carts 12, as generally show in FIGS. 1-3 more than one of shopping carts 12, for example substantially identical shopping carts 12 are pushed together into a horizontal stack. The cross-sectional views of FIGS. 11 and 12 provide additional insight into the interaction of two of the shopping carts 12, that is for illustration purposes a front one of shopping carts 12, or front shopping cart 12A, and a rear one of shopping carts 12, or rear shopping cart 12B. The front portion of chassis 30 with front wheels 18A of rear shopping cart 12B is pushed between rear wheels 18B of front shopping cart 12A and rear shopping cart 12B is continually pushed forwardly relative to front shopping cart 12A.

As rear shopping cart 12B is pushed forwardly, first curved front surface 62 the side struts 54 start to pass by the one, or in many occasions, the two, that is one on each longitudinal side of first shopping cart 12A, lifting fenders 20 of front shopping cart 12A. Since the side struts 54 of rear cart 12B gradually get taller toward the rear part of chassis 30, side struts 54 of rear shopping cart 12B each get closer and closer to the nearest lifting fender 20 of front shopping cart 12A as rear shopping cart 12B is pushed forward until each side strut 54 eventually makes contact with the nearest lifting fender 20 at a front tilted corner thereof at point of initiated contact 12, as indicated in FIG. 12 of front shopping cart 12A just above it. Once contact is initiated with lifting fender 20, continued forward movement of rear shopping cart 12B along with the continued upward taper of its side struts pushes upwardly, as indicated very generally by arrows $M_2$, on the lifting fenders 20 of front shopping cart 12A, which eventually pushes upwardly on rear cross bar 52 and a rear of front shopping cart 12A as a whole to lift rear wheels 18B of front shopping cart off of the supporting surface 22 as indicated as second distance $D_2$ in FIG. 11. Once rear wheels 18B are off of the support surface 22, only front wheels 18A of the plurality of shopping carts remain in contact with the supporting surface 22, making it easier to manipulate and move the horizontal stack of carts, since front wheels 18A are generally on casters 42, making them more easily turnable, etc. In this way, in a very long horizontal stack of shopping carts with many shopping carts can be moved safely and efficiently by one or two store workers.

In one embodiment, continued horizontal stacking of shopping carts 10 also moves front cross bar 50 of a rear one of shopping carts 10 into contact with tray 56 causing tray 56 to rotate about its coupling with its own front cross bar 50, lifting up slightly off of tray 56 to accommodate shopping cart behind it. In one example, tray 56 is configured to be resilient to return to sit back down on top of chassis 30 when the shopping cart 10 nested behind it is removed.

Although the invention has been described with respect to particular embodiments, such embodiments are meant for illustrative purposes only and should not be considered to limit the invention. Various alternatives and changes will be apparent to those of ordinary skill in the art upon reading this application. Other modifications within the scope of the invention and its various embodiments will be apparent to those of ordinary skill.

What is claimed is:

1. A shopping cart for use with at least one other shopping cart to form a horizontal stack of shopping carts, the shopping cart comprising:
   a support frame including a chassis and support masts extending substantially vertically upwardly from the chassis, wherein the chassis is coupled to front wheels and rear wheels and includes a rear cross bar extending laterally across the chassis and positioned between the front wheels and the rear wheels, the front wheels and the rear wheels being longitudinally spaced from each other;
   a basket supported by the support masts over the chassis, wherein the basket defines a compartment; and
   a lifting fender formed separately from the support frame and selectively coupled to an underside of the rear cross bar, the lifting fender defining a lift section extending below the rear cross bar and defining a bottom surface configured to be an initial contact point for a second, rear shopping cart when the horizontal stack of carts such that contact between the second, rear shopping cart and the lifting fender generally decreases contact between the second, rear shopping cart and the rear cross bar.

2. The shopping cart of claim 1, wherein the bottom surface of the lift section is positioned between about 10 degrees and about 25 degrees from parallel with a supporting surface when all of the front wheels and the rear wheels are contacting the supporting surface.

3. The shopping cart of claim 1, wherein the rear cross bar defines a laterally extending reception channel along the bottom surface thereof, and the lifting fender is slidably received within the reception channel.

4. The shopping cart of claim 1, wherein the lifting fender includes a coupling panel, an intermediate panel depending from the coupling panel, and the lift section depending from the coupling panel, the intermediate panel being slidably received within the reception channel, the intermediate panel extending out an opening to the reception channel, and the lift section extending below the reception channel for interaction with other shopping carts.

5. The shopping cart of claim 4, where the coupling panel including a locking feature configured to interact with a corresponding feature on a bottom of the rear cross bar of the chassis to additionally secure the lifting fender to the rear cross bar.

6. The shopping cart of claim 1, wherein the rear cross bar defines two laterally extending reception channels along the bottom surface thereof, each of the two laterally extending reception channels being laterally spaced from each other, and the lifting fender is a first lifting fender of two lifting fenders, and each of the two lifting fenders is slidably coupled in a different one of the two laterally extending reception channels.

7. The shopping cart of claim 6, in combination with the second, rear shopping cart wherein during horizontal stacking of the shopping cart and the second, rear shopping cart, the second, rear shopping cart is longitudinally pushed toward the shopping cart forcing a top surface of a chassis of the second, rear shopping cart to push against bottom surfaces of each of the two lifting fenders to lift the rear wheels of the shopping cart above a supporting surface that the front wheels of the shopping cart are resting upon.

8. The shopping cart in the combination of claim 7, wherein:
   the shopping cart includes a tray set on top of and coupled with the chassis to allow rotation of the tray about its coupling with the chassis, and
   during horizontal stacking of the shopping cart and the second, rear shopping cart, the second, rear shopping cart is longitudinally pushed toward the shopping cart first contacting the lifting fender and then contacting the tray, forcing the tray of the shopping cart to rotate upwardly about its front-based coupling.

9. The shopping cart of claim 1, wherein the shopping cart includes a tray set on top of the chassis, wherein the tray is configured to rotate upwardly about its front-based coupling with the chassis during horizontal stacking with a second, rear shopping cart.

10. The shopping cart of claim 9, in combination with the second, rear shopping cart, wherein during horizontal stacking of the shopping cart and the second, rear shopping cart, the second, rear shopping cart is longitudinally pushed toward the shopping cart first contacting the lifting fender and then contacting the tray, forcing the tray of the shopping cart to rotate upwardly about its front-based coupling.

11. A horizontal stack of shopping carts comprising:
   a front shopping cart including:
      a first support frame including a first chassis and support masts extending substantially vertically upwardly from the first chassis, wherein the first chassis is coupled to front wheels and rear wheels and includes a rear cross bar extending laterally across the first chassis and positioned between the front wheels and the rear wheels, the front wheels and the rear wheels being longitudinally spaced from each other,
      a basket supported by the support masts over the first chassis, wherein the basket defines a compartment, and
      a lifting fender formed separately from the first support frame and selectively coupled to an underside of the rear cross bar, the lifting fender defining a lift section extending below the rear cross bar and defining a bottom surface; and
   a rear shopping cart including:
      a second support frame including a second chassis having longitudinally extending support struts laterally spaced from each other;
      wherein one of the longitudinally extending support struts contacts the lifting fender of the front shopping cart holding the rear wheels of the front shopping cart off of a support surface supporting the front shopping cart and the rear shopping cart.

12. The horizontal stack of shopping carts of claim 11, wherein the lifting fender is configured to be an initial contact point for a rear shopping cart when the horizontal stack of shopping carts is formed such that contact between the rear shopping cart and the lifting fender prevents contact between the rear shopping cart and the rear cross bar.

13. The horizontal stack of shopping carts of claim 11, the bottom surface of the lift section is positioned between about 10 degrees and about 25 degrees from parallel with a supporting surface when all of the front wheels and the rear wheels are contacting the supporting surface.

14. The horizontal stack of shopping carts of claim 11, wherein the rear cross bar defines a laterally extending reception channel along the bottom surface thereof, and the lifting fender is slidably received within the reception channel.

15. The horizontal stack of shopping carts of claim 11, wherein the lifting fender includes a coupling panel, an intermediate panel depending from the coupling panel, and the lift section depending from the coupling panel, the intermediate panel being slidably received within the reception channel, the intermediate panel extending out an opening to the reception channel, and the lift section extending below the reception channel for interaction with the rear shopping cart.

16. The horizontal stack of shopping carts of claim 15, wherein the coupling panel includes a locking feature configured to interact with a corresponding feature on a bottom of the rear cross bar of the chassis to additionally secure the lifting fender to the rear cross bar.

17. A method of horizontally stacking shopping carts, comprising:

providing a front shopping cart including:

a first support frame including a first chassis and support masts extending substantially vertically upwardly from the first chassis, wherein the first chassis is coupled to front wheels and rear wheels and includes a rear cross bar extending laterally across the first chassis and positioned between the front wheels and the rear wheels, the front wheels and the rear wheels being longitudinally spaced from each other;

a basket supported by the support masts over the first chassis, wherein the basket defines a compartment; and a lifting fender formed separately from the support frame and selectively coupled to an underside of the rear cross bar, the lifting fender defining a lift section extending below a remainder of the rear cross bar and defining a bottom surface configured to be an initial contact point for a second, rear shopping cart when forming a horizontal stack of carts such that contact between the second, rear shopping cart and the lifting fender generally decreases contact between the second, rear shopping cart and the remainder of the rear cross bar; and pushing a rear shopping cart toward the front shopping cart, the rear shopping cart including a second support frame including a second chassis having longitudinally extending support struts laterally spaced from each other with rear wheels depending from the second support frame;

wherein pushing the rear shopping cart toward the front shopping cart includes moving one of the longitudinally extending support struts into increasing contact with the lifting fender of the front shopping cart to lift the rear wheels of the front shopping cart off of a support surface supporting the front shopping cart and the rear shopping cart.

18. The method of claim 17, wherein pushing the rear shopping cart toward the front shopping cart includes moving at least a front portion of the second chassis between the rear wheels of the front shopping cart.

19. The method of claim 18, wherein pushing the rear shopping cart toward the front shopping cart includes pushing a trap rotatably coupled a top the first chassis upwardly away from a rear portion of the first chassis.

20. The method of claim 18, wherein providing the front shopping cart includes sliding a portion of the lifting fender into a laterally extending reception channel formed integrally with and in an underside of the rear cross bar and selectively locking the lifting fender in place within the reception channel.

\* \* \* \* \*